March 1, 1960

W. E. BRILL 2,926,764

MAGNETIC PARTICLE COUPLING

Filed June 22, 1955

INVENTOR
William E. Brill
BY
J. C. Thorpe
ATTORNEY

March 1, 1960

W. E. BRILL 2,926,764

MAGNETIC PARTICLE COUPLING

Filed June 22, 1955

INVENTOR
William E. Brill
BY
J. C. Thorpe
ATTORNEY

United States Patent Office 2,926,764
Patented Mar. 1, 1960

2,926,764

MAGNETIC PARTICLE COUPLING

William Elmer Brill, Cleveland, Ohio, assignor to General Motors Corporation, Detroit, Mich., a corporation of Delaware Application June 22, 1955, Serial No. 517,160

8 Claims. (Cl. 192—21.5)

This invention relates to magnetic coupling devices and more particularly to magnetic couplings of the type employing dry magnetic particles which, when subjected to a magnetic field, act to transmit forces between two otherwise independently movable and relatively spaced members; such magnetic couplings being particularly adapted, among other uses, for controllably coupling a prime mover to a rotatable load.

Among the principal objects of the invention are to provide such a coupling with means for withdrawing all or a portion of the magnetic particle bonding material from the clutching space or air gap between the clutching members; to provide such a coupling with means for storing or retaining the withdrawn bonding material out of the clutching space; and to provide such a coupling with control means for cooperatively controlling the energization and operation of the coupling and the actuation of the particle withdrawing and retaining means.

It is also a principal object of the invention to provide such a coupling with means for confining the magnetic particle bonding material when the coupling is de-energized to prevent the magnetic particle material from floating in the working space or air gap of the de-energized coupling in a turbulent condition.

Another principal object of the invention is to provide such a coupling with means for dumping the coupling in a manner comparable with the dumping of other types of mechanical and fluid clutches by removing all or a portion of the inactive bonding material from the clutching space when the clutching electromagnets are partially or completely de-energized.

Still another object of the invention is to provide means for removing all or a portion of the inactive bonding material from the magnetic clutching space to dump the de-energized clutch and for retaining the removed magnetic material in an area adjacent the normal magnetic clutching space to prevent any substantial movement of the material within the coupling.

The advantages of the invention attained by so removing and storing all or a portion of the magnetic particle material away from the normal magnetic clutching space, include the provision for variable control of the slippage characteristics of the partially energized clutch; the reduction or elimination of wear of the clutch elements resulting from the abrasive action of the magnetic particles circulating in the de-energized clutch; the elimination or reduction of losses due to windage and turbulence within the de-energized clutch; and the reduction of undesirable particle wear or pulverization.

In accordance with the invention, the foregoing objects are attained by providing such a coupling with an electromagnetic coil winding in at least one of the clutch elements which is energizable in accordance with the operative position of the clutch controls to withdraw and store all or a portion of the magnetic bonding material within one or more pockets formed adjacent the normal magnetic clutching space or air gap of the coupling.

The foregoing and other objects, features, and advantages of the invention will be more thoroughly understood from the following description of a preferred embodiment thereof incorporated for illustrative purposes into a two-way dry-particle magnetic clutch mechanism, reference being had to the accompanying drawings, in which.

Figure 1:
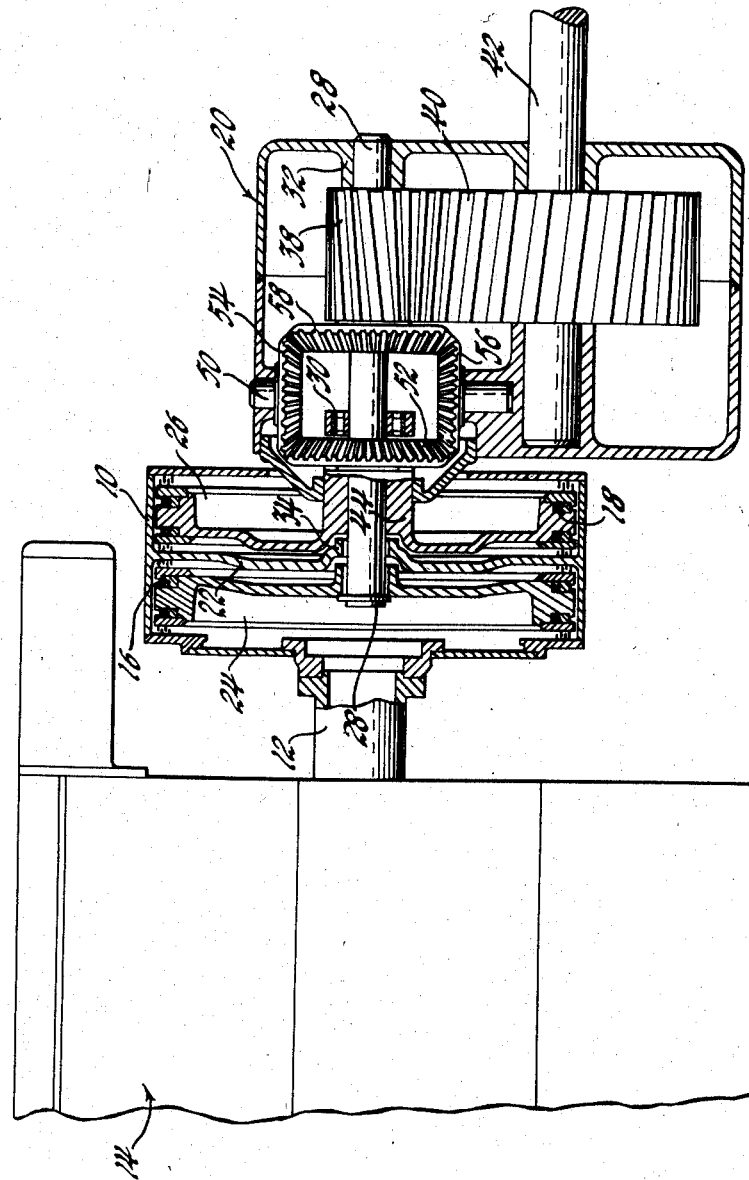
Figure 1 is a diagrammatic view of a power train particularly adapted for use as a marine reversing drive and including a two-way dry-particle magnetic clutch mechanism.
Figure 2:
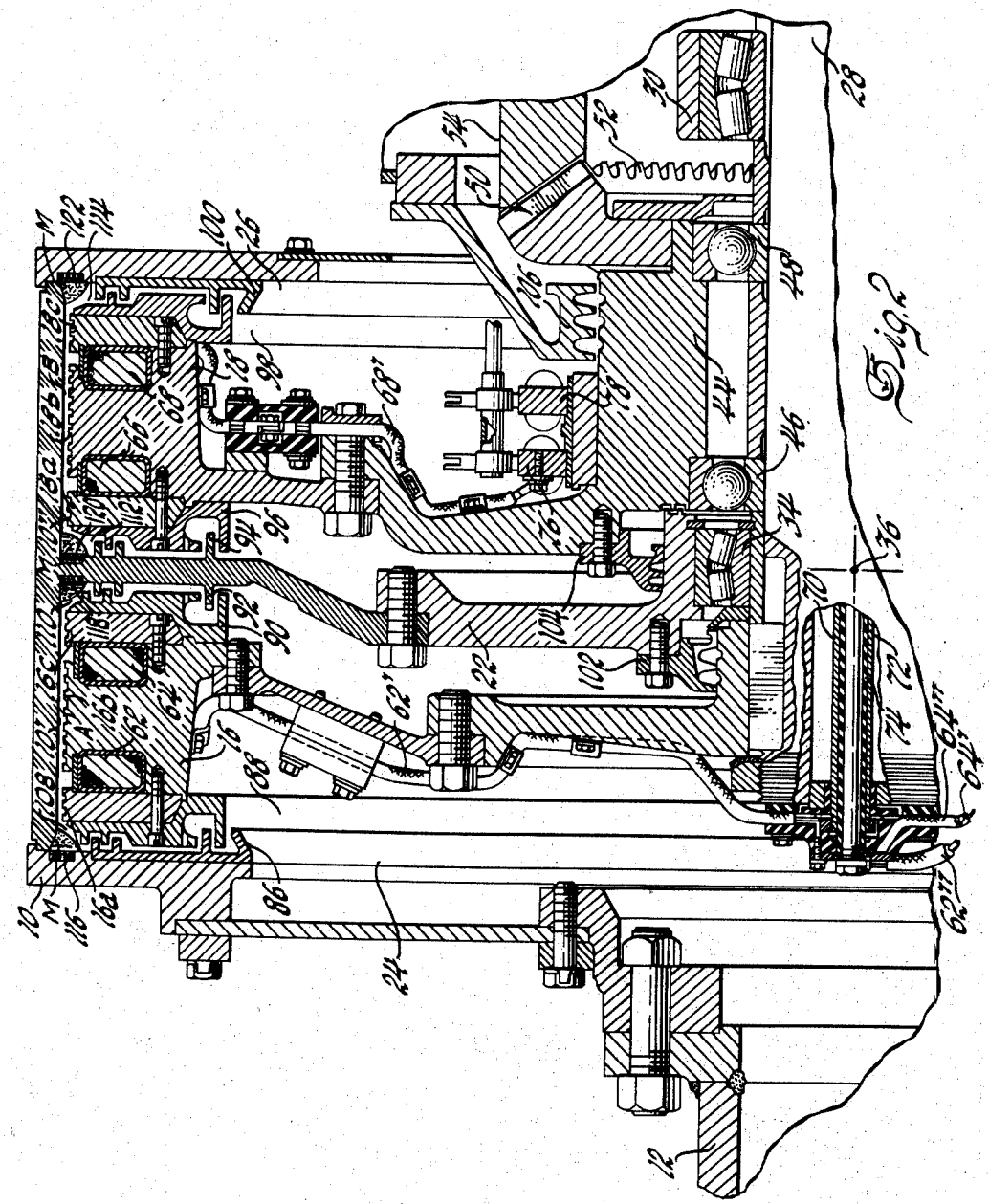
Figure 2 is an enlarged detailed sectional view of a two-way clutch similar to that shown diagrammatically in Figure 1 and embodying the invention.

Referring more particularly to Figures 1 and 2, an inductor or armature member 10 in the form of a drum-shaped shell constitutes the driving element of the coupling. The inductor drum 10 is suitably attached to a driving shaft 12 which is in turn driven by a prime mover 14 such as an internal combustion engine. A pair of annular field coil members 16 and 18 are rotatably mounted to extend within the driving shell 10 from a differential type reversing gear box 20 and are separated by a web 22 carried by the inductor shell; the web 20 dividing the interior of the induction shell into two clutch chambers 24 and 26.

The members 16 and 18 are adapted to be selectively driven by the inductor drum 10 as explained below to provide forward and reverse drive through the reversing gear 20. The forward-drive member 16 is secured to a shaft 28 journaled in the reversing gear box as indicated at 30 and 32 and in a bearing 34 carried by the web 22. The bearing 34 is preferably of a self aligning roller type permitting a degree of angular misalignment between the engine and gear box shafts 12 and 28 about a point of intersection 36 of the longitudinal axis of the driven shaft 28 and of a central plane normal to the axis of the roller bearing 34. A pinion gear 38 secured to the shaft 28 meshes with a main gear 40 secured to a gear-box-journaled output shaft 42 to provide forward drive when the member 16 is coupled to the drive member 10.

The hub 44 of the reverse-drive member 18 is suitably journaled on the shaft 28 such as by axially spaced roller bearings 46 and 48 as shown in Figure 2. When the member 18 is coupled to the driving shell 10, the direction of rotation of the shaft 28, and consequentially of the output shaft 42, is reversed through a differential gear arrangement 50 in a rotational direction opposite to that of members 10 and 18. The differential gear arrangement 50 includes a bevel gear 52 secured to the hub 44 and meshing with two bevel idler gears 54 and 56, which in turn drive a bevel gear 58 secured to the shaft 28.

It should be noted that when either of the members 16 or 18 are drivingly coupled to the induction drum, the other member will be driven through the differential gear arrangement 50 in a rotational direction opposite to that of the drum.

As best shown in Figure 2, the annular field coil members 16 and 18 are essentially electromagnets provided with annular field coil windings 62, 64 and 66, 68, respectively, and having face portions 16a, 16b, 16c and 18a, 18b, 18c, respectively, forming electromagnetic poles about their respective field coil windings. These electromagnetic pole face portions of the members 16 and 18 are in opposed radially spaced relation to inner face portions 10' and 10", respectively, of the driving shell to form annular air gaps A and B therebetween. The annular field coil windings 62 and 64 of the driven member 16 are connected by leads 62', 62" and 64', 64", respectively, to concentric conducting rails 70 and 72 separated by a cylindrical insulator 74 and extending through the shaft 28. The annular field coil windings 66 and 68 of the driven member 18 are connected by suitable leads, only one of which 68' is shown, to the slip rings 76 and 78. The conductor rails 70 and 72 and the slip rings 76 and 78 are selectively connectable to a source of direct current 80 through a control mechanism 82 to selectively energize the windings 62, 64 and 66, 68 of the field members to establish magnetic fields bridging the gaps A and B between the member 10 and their respective members 16 and 18. The control mechanism 82 is adapted to vary the potential delivered to the energized field coils and is shown schematically in Figure 7 and described in greater detail below.

Flowable magnetic material M of magnetically variable sheer strength in the respective clutch chambers 24 and 26 is responsive to the magnetic fields selectively established across the respective gaps A and B to effect a lubricated load-transmitting bond between the face portions of the energized driven member and the driving shell to thereby selectively couple either the member 16 or 18 to the drum to provide either forward or reverse drive, respectively, as the case may be, through the reversing gear box 20. The extent to which the driving and driven clutch members are coupled to each other is dependent upon the magnitude of the magnetic field set up between the members. This is similar to the coupling action in eddy-current couplings, but differs in that with proper field strength the two members may be magnetically locked together to rotate at the same speed through the interlocking action of the magnetic particles. The magnetic material M may be either in the form of a mixture of dry magnetic particles and a dry lubricant powder or in the form of dry magnetic particles having inherent self-lubricating properties. Preferably the quantity of magnetic particle material utilized in each clutch chamber should be in an amount substantially filling or bridging the air gap between the inductor drum and the respective field coil member.

Figure 5:
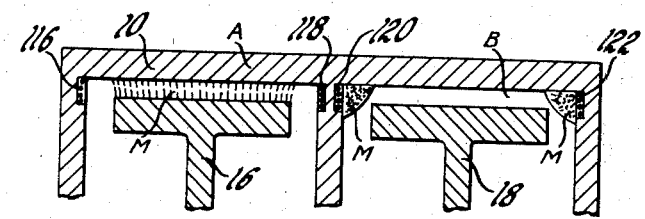
Figure 6:
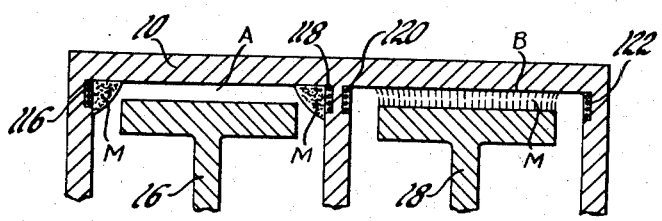

To provide forward drive through the coupling to the reversing gear mechanism output shaft 42, the annular field coil windings 62 and 64 of the member 16 are energized setting up a magnetic field bridging gap A. The established field magnetizes the magnetic material in the chamber 24 and draws the particles into the gap A. The induced magnetism of the particles tends to electromagnetically couple the driving member 10 and the driven member 16 together, as shown in Figure 5. When the field of member 16 is de-energized, the flowable magnetic material is released de-clutching the driven field member 16 from the driving shell or drum 10. The annular field coil windings 66 and 68 of the reversing member 18 may then be energized to establish a field across gap B causing the particles in the chamber 26 to be magnetized into a load transmitting bond tending to couple the member 18 with the driving shell 10 as shown in Figure 6, thereby providing reverse drive to the shaft 42 through the gear box 20. It will be obvious that the windings of the non-driven field member 18 or 16 are de-energized when the coupling is placed in forward or reverse drive operation, respectively.

At normal engine operating speeds the rotation of the driving shell will normally be sufficient in such magnetic particle couplings to centrifuge the inactive magnetic material M against the inner faces of the shell when the field coils of the adjacent field member of the coupling are de-energized. However, since the centrifuging action of the driving shell on the individual particles approaches a minimum at relatively low engine speeds, the effect of gravity causes these particles to fall inwardly of the coupling. This tendency of the particles to move inwardly of the coupling at relatively low engine speeds is further accentuated by a certain amount of turbulence which is set up in the air spaces separating the driving and motored members by the relative rotation between these members. In a two-way clutch mechanism, such as shown and described above, when the field coils of one driven member are energized coupling it to the driving member, the other field member is motored in the reverse direction through the differential reversing gear arrangement; the relative rotational speed between the driving member and the de-energized field member being twice the rotational speed of the driving member. Such reverse rotation sets up an additional amount of turbulence and increases the tendency of the smaller or finer particles of the magnetic material to move inwardly of the coupling.

To prevent the passage of such magnetic particles inwardly of the couplings under such conditions of operation cooperative labyrinth type particle sealing members are provided, as indicated at 86, 88, 90, 92, 94, 96, 98 and 100, which are mounted on or formed integrally with the end plates and web of the driving member and end faces of the field coil members. These sealing members require particles moving inwardly of the coupling to change their direction before passing between the coacting sealing surface within belts of relatively laminar air flow from which the particles tend to be returned radially outwardly to the inner periphery of the drum by centrifugal action. Leakage flux and residual flux from induced magnetism occurring between the labyrinth sealing members also serves to a limited extent to prevent movement of the particles inwardly of the coupling. Additional labyrinth sealing members are provided as indicated at 102, 104 and 106 to further protect the bearings 34, 46, 48 and 30 and the differential gear mechanism 50 from the particles leaking inwardly of the clutch.

The labyrinth seals and centrifugal action of the drum 10 are generally effective to properly seal such magnetic particle couplings for most applications. However, it has been found that in applications such as marine drives, where the engine and clutch mechanism are operated at relatively low speed and under slip conditions for substantial periods of time, that the particle leakage from such couplings is excessive. It has also been found under such operative conditions that windage and turbulence within the de-energized clutch subject the clutch elements to excessive abrasive action by the magnetic particles circulating in the clutch, cause undesirable particle pulverization accentuating the sealing problem, and result in undesirable power losses.

To eliminate the aforementioned difficulties and to provide a coupling of increased controllability the invention contemplates providing such magnetic particle couplings as hereinbefore described with means for removing and storing all or a portion of the magnetic particle bonding material away from the clutching space or air gap between the clutching members when the clutching electromagnets are partially or completely de-energized.

In accordance with the invention the inner surfaces of the drum 10 and the labyrinth sealing members form annular reservoirs or pockets 108, 110 and 112, 114 adjacent the ends of the annular air gaps A and B, respectively; and field coils 116, 118, 120 and 122 carried by the drum member 10 adjacent the respective annular reservoirs are selectively and controllably energizable in accordance with the operative position of the clutch control mechanism 82, as explained in detail below, to remove all or a portion of the magnetic bonding material from the air gap clutching space and to retain the withdrawn particles within the adjacent reservoir or pocket. By providing means for so removing or storing all or a portion of the magnetic particle material away from the normal magnetic clutching space or gap it is possible to provide for variable control of the slippage characteristics of the partially energized clutch and to prevent the unrestricted circulation of magnetic particles within the slipping or de-energized clutch which results in undesirable particle wear or pulverization aggravating the leakage of magnetic particles; in abrasive wear of the clutch elements; and in excessive windage and turbulence losses.

Briefly, the control mechanism 82 comprises rheostats 124 and 126, each of which is in series with and operable to control the excitation of clutching field coils 62, 64 and 66, 68, respectively, and rheostats 128 and 130 which are each in series with and operable to control the excitation of particle storing field coils 116, 118 and 120, 122, respectively. The rheostats 124, 126, 128 and 130 are preferably operably interconnected as indicated by the broken lines 132 so that conventional plural station single quadrant controls (not shown) may be utilized to control the direction and speed of the output shaft 42 and to selectively and controllably energize the particle storing coils in accordance with the energization or de-energization of the clutching coils.

The control mechanism 82 may also include a plurality of interlocking switches 134, 136, 138 and 140 which are effective to control the energization of field coils 62, 64; 66, 68; 116, 118; and 120, 122, respectively. The various interlocking switches are operably connected to the quadrant controlling the rheostats as indicated by the broken line 139. The switch 134 is provided with poles *a* and *b* which are connectable as shown to the plus terminal of the direct current power source 80 and to the clutching field controlling rheostat 124, respectively. The switch 136 is similarly provided with poles *c* and *d* which are connected to the plus terminal of the direct current power source and to the particle storing field controlling rheostat 128. The switch 138 is provided with poles *e* and *f* which are connectable as shown to the plus terminal of the direct current power source 80 and to the clutching field controlling rheostat 126, respectively. The switch 140 is similarly provided with poles *g* and *h* which are connected to the plus terminal + of the direct current power source and to the particle storing field controlling rheostat 130.

Figure 3:
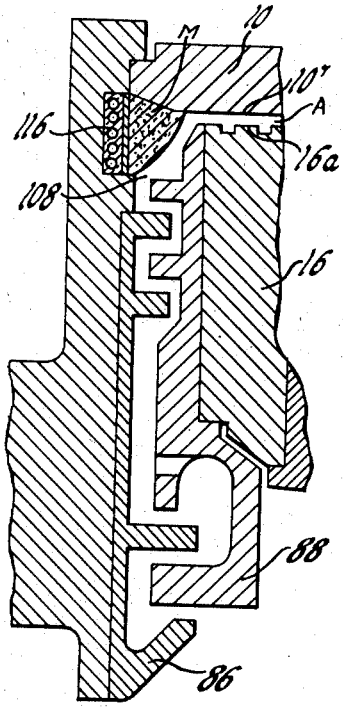
Figure 3 is a still further enlarged fragmentary view of a portion of the two-way clutch shown in Figure 2.
Figure 4:
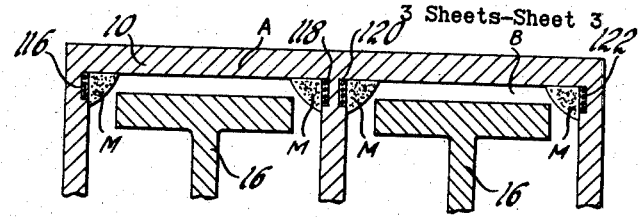
Figures 4, 5 and 6 are diagrammatic views showing various operative conditions of the two-way clutch shown in Figure 2.
Figure 7:
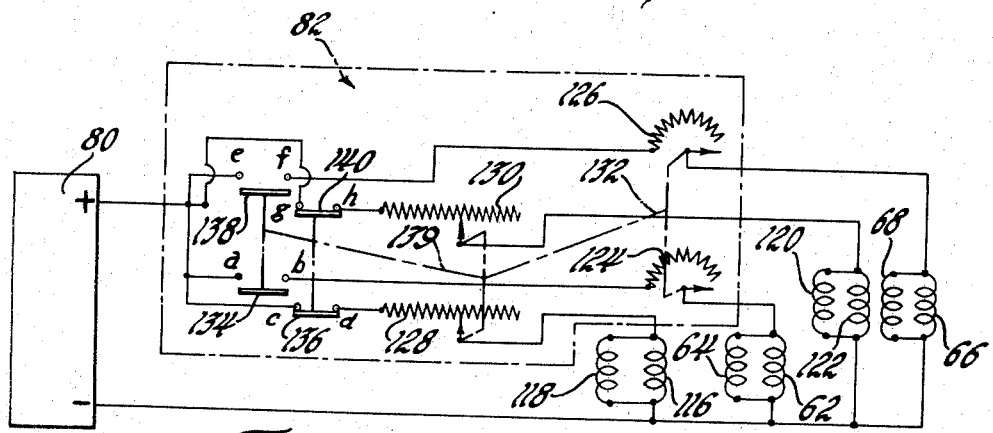
Figure 7 is a schematic diagram of an electrical control circuit for a two-way clutch similar to that shown in Figure 2.

When the control quadrant is in the neutral position the various field controlling rheostats and switches are in the position shown in Figure 7; the particle storing field coil windings 116, 118 and 120, 122 of both clutch units being energized while the clutching field coil windings of both units are de-energized. When the particle storing field coils are so energized, the magnetic particle bonding material in chambers 24 and 26 is withdrawn from the respective air gaps A and B and stored in the annular reservoids 108, 110, 112 and 114 as shown in Figures 2, 3 and 4.

When the speed control quadrant is shifted from the neutral position to forward, the switch 134 is closed and the switch 136 is opened energizing and de-energizing the field coils 62, 64 and 116, 118, respectively. The energization of the field coils 62 and 64 tends to draw a portion of the magnetic particle material from the pockets 108 and 110 into the air gap A where it establishes a lubricated load transmitting bond between the members 16 and 10. The initial bond established permits relative slippage between the members. However, as the quadrant control is advanced in the forward position, the resistance of the rheostat 124 is progressively removed from the circuit increasing the field excitation current flowing through the field coils 62 and 64 until substantially all of the magnetic particles are activated to provide a locked-up condition between the members 16 and 10. When the power train is in forward drive operation, the switches 138 and 140 remain in their opened and closed positions, respectively, maintaining the reversing clutch field coils de-energized and the reversing clutch storage fields energized to maintain the inactive particles into the pockets 112 and 114.

To provide reverse drive operation of the clutching and transmission mechanism, the quadrant control is shifted back through the neutral position into reverse. This causes the forward clutch switches 134 and 136 to open and close, respectively, and at the same time causes the reversing clutch switches 138 and 140 to close and open, respectively. The opened switch 134 de-energizes the forward clutch field and allows the storage field coils 120 and 122, energized by the closing of switch 136, to draw the magnetic particle material within chamber 24 into the annular reservoirs 108 and 110. The closed switch 138 causes the energization of the reversing field coils 66 and 68 while the opening of the switch 140 de-energizes the particles storing field coils 120, 122 permitting the clutching field to draw the magnetic particle material into the reversing clutch air gap B where progressive removal of the resistance of rheostat 126 from the system results in increased energization of the field coils 66 and 68 until a locked-up condition occurs between the field coil members 18 and 10.

It will be obvious to those skilled in the art that the operable connections 132 and 139 between the rheostats 124, 126, 128, and 130 and the switches 134, 136, 138 and 140 may also be so arranged that the main field coils and the storage field coils of each clutch unit may be simultaneously and controllably energized to control the quantity of magnetic particle material within the air gap of the unit to control the slippage characteristics of the particular unit. Such operation would be particularly advantageous in obtaining output shaft speeds below the minimum stable engine speed for moving the loading mechanism at a very slow speed or for holding a loading mechanism stationary, e.g., marine propulsion drives, cranes, etc.

It is also contemplated that the operation of the storage field controlling rheostats 128 and 130 may be such as to provide a higher initial excitation of the storage field coils 116, 118 and 120, 122, respectively, during the period when the magnetic particles are being withdrawn from the adjacent air gap than during the normal storage period.

While only one specific embodiment of the invention has been shown and described for the purposes of illustration, it will be appreciated that various modifications may be made without departing from the spirit and scope of the invention as defined in the following claims.

What is claimed is:

1. A coupling device including at least a pair of coupling members mounted for rotation relative to each other and having opposed relatively spaced face portions defining an annular air gap therebetween, means adapting one of said member to act as a driving member and adapting the other of said members to apply a driving force to a load, means for establishing a primary magnetic field bridging the air gap between said face portions, a dry magnetic particle bonding material between said members and responsive to said field for establishing a load-transmitting bond between said surfaces whereby rotation of said one member at least tends to cause rotation of said other member, means for establishing a secondary magnetic field for withdrawing said dry magnetic particle material from between said face portions and for retaining said material adjacent said gap when said first-mentioned means is de-energized, and control means for selectively and for simultaneously and progressively varying the energization of said primary and secondary magnetic field establishing means to thereby control the quantity of magnetic particle material in said air gap, and said control means including interlocking means operable to energize said secondary magnetic field establishing means whenever said primary field is substantially de-energized.

2. A coupling device including at least a pair of coupling members mounted for rotation relative to each other and having opposed radially spaced face portions defining at least one substantially cylindrical air gap therebetween, said air gaps being in communication with the atmosphere without said device, means adapting one of said members to act as a driving member, means adapting the other of said members to apply a driving force to a load, means for establishing a primary magnetic field bridging the air gap between said face portions including control means operable to vary the intensity of the magnetic field established between said face portions, a dry magnetic particle bonding material of a quantity to substantially fill the air gap between said members and responsive to said field for establishing a load-transmitting bond between said surfaces whereby rotation of said one member at least tends to cause rotation of said other member, means for establishing a secondary magnetic field adapted to withdraw at least a portion of said dry magnetic particle material from between said face portions and to magnetically retain said withdrawn material within said device adjacent the end of said cylindrical air gap, and secondary control means associated with said first-mentioned control means and operable to activate said secondary magnetic field establishing means and to vary the intensity of said secondary field in accordance with the intensity of said primary magnetic field.

3. A coupling device including, in combination, a pair of coupling members mounted for rotation relative to each other and having opposed face portions separated by an air gap, said air gap being in continuous communication with the atmosphere outside said device, means adapting one of said members to act as a driving member and adapting the other of said members to apply a driving force to a load, means energizable to establish a magnetic field bridging said gap, dry magnetic particle bonding material in said device and responsive to said field to establish a load-transmitting bond between said surfaces whereby rotation of said one member at least tends to cause rotation of said other member, said material being limited to a quantity substantially filling said gap when under the influence of said magnetic field, means energizable to establish a secondary magnetic field adjacent at least one end of said air gap for withdrawing at least a portion of said dry magnetic particle bonding material from said gap and for retaining such dry particle material within said device when said first-mentioned field establishing means is de-energized, and interlocking control means for said magnetic field establishing means whereby each of said field establishing means is selectively energizable when said other means is de-energized.

4. A coupling device including at least a pair of coupling members mounted for rotation relative to each other and having opposed radially spaced cylindrical face portions, means adapting one of said members to act as a driving member, means adapting the other of said members to apply a driving force to a load, means for establishing a primary magnetic field between said face portions including control means operable to activate and to vary the intensity of the magnetic field established between said face portions, a magnetic particle bonding material in said device and responsive to said field for establishing a load-transmitting bond between said surfaces whereby rotation of said one member at least tends to cause rotation of said other member, said magnetic material being limited to a quantity adapted to substantially fill the space between said members under the influence of said primary field, means for establishing at least one secondary magnetic field operable to control the slippage between said members and to prevent excessive particle movement within the device when said primary field is de-energized by withdrawing at least a portion of said magnetic particle material from between said face portions and retaining such withdrawn material adjacent the ends of said spaced face portions, and secondary magnetic field control means associated with said first-mentioned control means, said secondary control means being operable to activate said secondary magnetic field establishing means and to vary the intensity of said secondary field in accordance with the intensity of said primary magnetic field.

5. A coupling mechanism comprising, respectively, outer and inner relatively rotary driving and driven magnetic armature and magnetic field members defining an annular magnetic air gap therebetween, the outer armature member also constituting a chamber adapted to retain a dry magnetic particle mixture, said magnetic particle mixture in said chamber being in an amount such as to slightly exceed the volume of the air gap but only partially filling said gap without any substantial contract between the particle mixture and the inner member when the particle mixture is under influence of rotation of the outer member sufficient to induce centrifugal distribution of said particle mixture within the outer member, means associated with one of said members and controllable to establish a primary magnetic field of variable strength interconnecting said members across said air gap, said particle mixture under a substantial field strength established by said primary field means being magnetically influenced sufficiently against centrifugal force to cause it to take up a position bridging at least a part of the gap thereby establishing a magnetic load transmitting bond between said members, means for controllably establishing a secondary magnetic field adapted to withdraw at least a portion of said particle mixture from the gap and to magnetically retain said mixture thereby preventing windage and turbulence of said dry magnetic particle mixture within said chamber when the field strength of the primary field means is sufficiently reduced and the rotational speed of the outer member is insufficient to centrifugally distribute said particle mixture in the outer member, and interlocking control means for said controllable field establishing means operable to permit the simultaneous energization of said primary and secondary field establishing means and to insure the energization of said secondary field establishing means when said primary field establishing means is de-energized.

6. A coupling device including, in combination, a pair of coupling members mounted for rotation relative to each other and having opposed radially spaced cylindrical face portions separated by an annular air gap, means adapting one of said members to act as a driving member and adapting the other of said members to apply a driving force to a load, a first electromagnetic means energizable to establish a primary magnetic field bridging said gap, dry magnetic particle bonding material in said device of a quantity substantially filling said gap when under the influence of said primary field and responsive to said field to establish a load-transmitting bond between said surfaces whereby rotation of said one member at least tends to cause rotation of said other member, a second electromagnetic means energizable to establish a secondary magnetic field adjacent at least one end of said annular air gap and adapted to withdraw at least a portion of said dry magnetic particle bonding material from said gap and to retain said material within said device whenever said first electromagnetic means is de-energized, and means for controlling the energization of said electromagnetic means for selectively and for simultaneously and progressively varying the intensities of the primary and secondary magnetic fields to progressively control the load-transmitting quantity of magnetic particles in said gap and including interlocking means operable to energize said second electromagnetic means whenever the magnetic field established by said first electromagnetic means is reduced below a predetermined field strength.

7. An electromagnetic coupling device comprising relatively rotary outer and inner driving and driven members, one of said members constituting a magnetic armature and the other constituting a magnetic inductor member, said members having radially spaced cylindrical surfaces defining an annular magnetic air gap therebetween, a first field coil carried by said armature member and energizable to provide a toroidal flux field interlinking said members across said gap, said outer member constituting a casing having at least one annular reservoir therein communicating laterally with said gap, said gap and said reservoir being in open communication with the atmosphere outside said coupling device, an amount of dry magnetic particle mixture in said casing adapted upon rotation of the outer member to be centrifugally carried thereby with substantial spacing between said material and the surface of said inner member when said coil is de-energized but to be drawn laterally into said gap from said reservoirs to substantially fill said gap thereby establishing a magnetic load transmitting bond between said members upon energization of said coil, a second field coil carried by said outer member adjacent each of said reservoirs, said secondary field coils being energizable to provide toroidal flux fields adapted to withdraw at least a portion of said dry magnetic particle mixture into each of said reservoirs and to retain said dry magnetic particle mixture within said device, and control means for energizing said first and said second field coils and including interlock means for energizing said first field coil as said second field coil is de-energized and for energizing said second field coil whenever the field strength of the primary field coil is reduced below a predetermined intensity thereby preventing windage and turbulence of said dry magnetic particle mixture within said casing.

8. A magnetic particle clutch of the character described including a driving member and a driven member, a housing associated with said members, and adapted to contain magnetic particles, said driving and driven members being arranged to form a magnetic circuit with a relatively narrow gap between said members within said housing, electrical means for energizing said magnetic circuit to cause a concentration of magnetic particles in said gap to drivingly couple said driving member to said driven member, said housing being constructed to have a space for containing the magnetic particles which is large as compared to the dimension of said gap, electromagnetic means positioned adjacent said housing space and adapted when energized to attract the magnetic particles and withdraw them from said gap and from the vicinity of te driven member whereby the driven member is quickly decoupled from the driving member, and means for selectively and for simultaneously and progressively varying the energization of said electrical means and of said electromagnetic means to thereby selectively and progressively control the quantity of magnetic particles permitted in said gap and thereby the load-transmitting couple effected between the driving and driven members for a given energization of said magnetic circuit energizing electrical means.

References Cited in the file of this patent

UNITED STATES PATENTS

| | | |
|---|---|---|
| 2,525,571 | Winther | Oct. 10, 1950 |
| 2,541,831 | Prince | Feb. 13, 1951 |
| 2,543,394 | Winther | Feb. 27, 1951 |
| 2,573,065 | Salemme | Oct. 30, 1951 |
| 2,612,248 | Feiertag | Sept. 30, 1952 |
| 2,617,507 | Feiertag | Nov. 11, 1952 |
| 2,629,471 | Rabinow | Feb. 24, 1953 |
| 2,829,747 | Morse | Apr. 8, 1958 |

FOREIGN PATENTS

| | | |
|---|---|---|
| 892,098 | Germany | Oct. 5, 1953 |